(12) United States Patent
Onuma

(10) Patent No.: US 11,442,801 B2
(45) Date of Patent: Sep. 13, 2022

(54) ERROR RATE MEASURING APPARATUS AND ERROR COUNTING METHOD

(71) Applicant: ANRITSU CORPORATION, Kanagawa (JP)

(72) Inventor: Hiroyuki Onuma, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/170,041

(22) Filed: Feb. 8, 2021

(65) Prior Publication Data

US 2021/0286662 A1 Sep. 16, 2021

(30) Foreign Application Priority Data

Mar. 13, 2020 (JP) .............................. JP2020-044421

(51) Int. Cl.
*G06F 11/07* (2006.01)
*G06F 11/32* (2006.01)
*G06F 11/263* (2006.01)

(52) U.S. Cl.
CPC ........ *G06F 11/076* (2013.01); *G06F 11/0772* (2013.01); *G06F 11/263* (2013.01); *G06F 11/326* (2013.01)

(58) Field of Classification Search
None
See application file for complete search history.

(56) References Cited

U.S. PATENT DOCUMENTS 10,567,123 B2 * 2/2020 Pepper .................. H04L 1/0045

FOREIGN PATENT DOCUMENTS

JP 2007-274474 A 10/2007
JP 5154585 B2 * 2/2013

* cited by examiner

*Primary Examiner* — April Y Blair
*Assistant Examiner* — Matthew W Wahlin
(74) *Attorney, Agent, or Firm* — Pearne & Gordon LLP

(57) ABSTRACT

An error rate measuring apparatus includes an operation unit that sets one Codeword length and one FEC Symbol length of FEC according to a communication standard of a device under test, data division means for dividing symbol string data obtained by converting a signal received from the device under test into MSB data and LSB data, a data comparison unit that compares each of the divided MSB data and LSB data with error data to detect MSB errors and LSB errors of each one Codeword length, and detects FEC Symbol Errors of each of the MSB data and the LSB data at one FEC Symbol interval, and error counting means for counting the detected MSB errors and LSB errors, and counting the FEC Symbol Errors.

8 Claims, 7 Drawing Sheets

US 11,442,801 B2

ERROR RATE MEASURING APPARATUS AND ERROR COUNTING METHOD

TECHNICAL FIELD

The present invention relates to an error rate measuring apparatus that transmits a known pattern (non return to zero (NRZ) signal or pulse amplitude modulation 4 (PAM4) signal) as a test signal to a device under test in a state in which the device under test has transited to a state of a signal pattern return and measures a bit error rate of input data returned and received from the device under test in compliance with the transmission of the test signal, and in particular, measures whether or not a forward error correction (FEC) operation of the device under test is possible, and an error counting method.

BACKGROUND ART

For example, as disclosed in Patent Document 1 described below, an error rate measuring apparatus is hitherto known as an apparatus that transmits a test signal of a known pattern including fixed data to a device under test and compares a signal under test returned and received from the device under test in compliance with the transmission of the test signal with a reference signal to be a reference in units of bits to measure a bit error rate (BER)

Incidentally, in a case where a PAM is particularly used as the test signal, while a large amount of transmission can be realized compared to non return to zero (NRZ), an Eye opening is small, and thus, a signal to noise ratio (SNR) is damaged compared to the NRZ. For this reason, as the number of symbols increases, the influence of noise also becomes large, and it is extremely difficult to make errors zero. Therefore, it is desirable to count FEC Symbol Errors that occur in a region according to a communication standard according to the device under test to be measured and to measure whether or not error correction based on forward error correction (FEC) is possible.

RELATED ART DOCUMENT

[Patent Document]
  [Patent Document 1] JP-A-2007-274474

DISCLOSURE OF THE INVENTION

Problem that the Invention is to Solve

However, in the error rate measuring apparatus of the related art, in measuring the propriety of error correction based on the above-described FEC described above, there is no counting function of FEC Symbol Errors that occurs in the region according to the communication standard of the device under test to be measured. Thus, there is a problem that it is not possible to confirm the FEC Symbol Errors with a numerical value, a lot of time is needed to investigate a cause of defect of the device under test, and it is not possible to perform efficient debugging.

Accordingly, the invention has been accomplished in view of the above-described problem, and an object of the invention is to provide an error rate measuring apparatus and an error counting method capable of counting FEC Symbol Errors in a region set by a user based on a communication standard of a device under test.

Means for Solving the Problem

To achieve the above-described object, there is provided an error rate measuring apparatus 1 according to a first aspect of the invention that inputs a non return to zero (NRZ) signal of a known pattern as a test signal to a device under test W, receives a signal from the device under test compliant with the input of the test signal, and measures whether or not a forward error correction (FEC) operation of the device under test is possible based on a comparison result of the signal received from the device under test and the test signal. The error rate measuring apparatus includes an operation unit 4 that sets one Codeword length and one FEC Symbol length of the FEC according to a communication standard of the device under test, a data comparison unit 3d that compares bit string data obtained by converting the signal received from the device under test with predetermined error data to detect errors of each one Codeword length, and detects FEC Symbol Errors of the bit string data at one FEC Symbol interval, and error counting means 7a for counting the number of errors and the number of FEC Symbol Errors of each one Codeword length detected by the data comparison unit.

To achieve the above-described object, there is provided an error rate measuring apparatus 1 according to a second aspect of the invention that inputs a pulse amplitude modulation 4 (PAM4) signal of a known pattern as a test signal to a device under test W, receives a signal from the device under test compliant with the input of the test signal, and measures whether or not a forward error correction (FEC) operation of the device under test is possible based on a comparison result of the signal received from the device under test and the test signal. The error rate measuring apparatus includes an operation unit 4 that sets one Codeword length and one FEC Symbol length of the FEC according to a communication standard of the device under test, data division means 3da for dividing symbol string data obtained by converting the signal received from the device under test into most significant bit (MSB) string data and least significant bit (LSB) string data, a data comparison unit 3d for comparing each of the most significant bit string data and the least significant bit string data divided by the data division means with predetermined error data to detect most significant bit errors and least significant bit errors of each one Codeword length, and detects FEC Symbol Errors of each of the most significant bit string data and the least significant bit string data at one FEC Symbol interval, and error counting means 7a for counting the number of most significant bit errors and the number of least significant bit errors, and the number of FEC Symbol Errors detected by the data comparison unit.

According to a third aspect of the invention, in the error rate measuring apparatus of the first or second aspect, a display unit 6 that displays an error rate and an error count value based on a result of the counting.

According to a fourth aspect of the invention, there is provided an error counting method for an error rate measuring apparatus that inputs a non return to zero (NRZ) signal of a known pattern as a test signal to a device under test W, receives a signal from the device under test compliant with the input of the test signal, and measures whether or not a forward error correction (FEC) operation of the device under test is possible based on a comparison result of the signal received from the device under test and the test signal. The error counting method includes a step of setting one Codeword length and one FEC Symbol length of the FEC according to a communication standard of the device under test, a step of comparing bit string data obtained by converting the signal received from the device under test with predetermined error data to detect errors of each one Codeword length, and detecting FEC Symbol Errors of the bit string data at one FEC Symbol interval, and a step of counting the number of detected errors and the number of detected FEC Symbol Errors of each one Codeword length.

According to a fifth aspect of the invention, there is provided an error counting method for an error rate measuring apparatus 1 that inputs a pulse amplitude modulation 4 (PAM4) signal of a known pattern as a test signal to a device under test W, receives a signal from the device under test compliant with the input of the test signal, and measures whether or not a forward error correction (FEC) operation of the device under test is possible based on a comparison result of the signal received from the device under test and the test signal. The error counting method includes a step of setting one Codeword length and one FEC Symbol length of the FEC according to a communication standard of the device under test, a step of dividing symbol string data obtained by converting the signal received from the device under test into most significant bit (MSB) string data and least significant bit (LSB) string data, a step of comparing each of the divided most significant bit string data and least significant bit string data with predetermined error data to detect most significant bit errors and least significant bit errors of each one Codeword length, and detecting FEC Symbol Errors of each of the most significant bit string data and the least significant bit string data at one FEC Symbol interval, and a step of counting the number of detected most significant bit errors and the number of detected least significant bit errors, and the number of detected FEC Symbol Errors.

According to a sixth aspect of the invention, the error counting method for an error rate measuring apparatus according to the fourth or fifth aspect further includes a step of displaying an error rate and an error count value based on a result of the counting.

Advantage of the Invention

According to the invention, it is possible to count FEC Symbol Errors in a region set by a user according to a communication standard of a device under test. In addition, the number of counted FEC Symbol Errors can be confirmed with a numerical value on a display screen, and thus, it is possible to efficiently perform debugging.

BEST MODE FOR CARRYING OUT THE INVENTION

Hereinafter, a mode for carrying out the invention will be described in detail referring to the accompanying drawings.

An error rate measuring apparatus according to the invention transmits a test signal of a known pattern to a device under test in a state in which the device under test has transited to a state of signal pattern return and measures an error rate of a received signal returned from the device under test in compliance with the transmission of the test signal.

Figure 1:
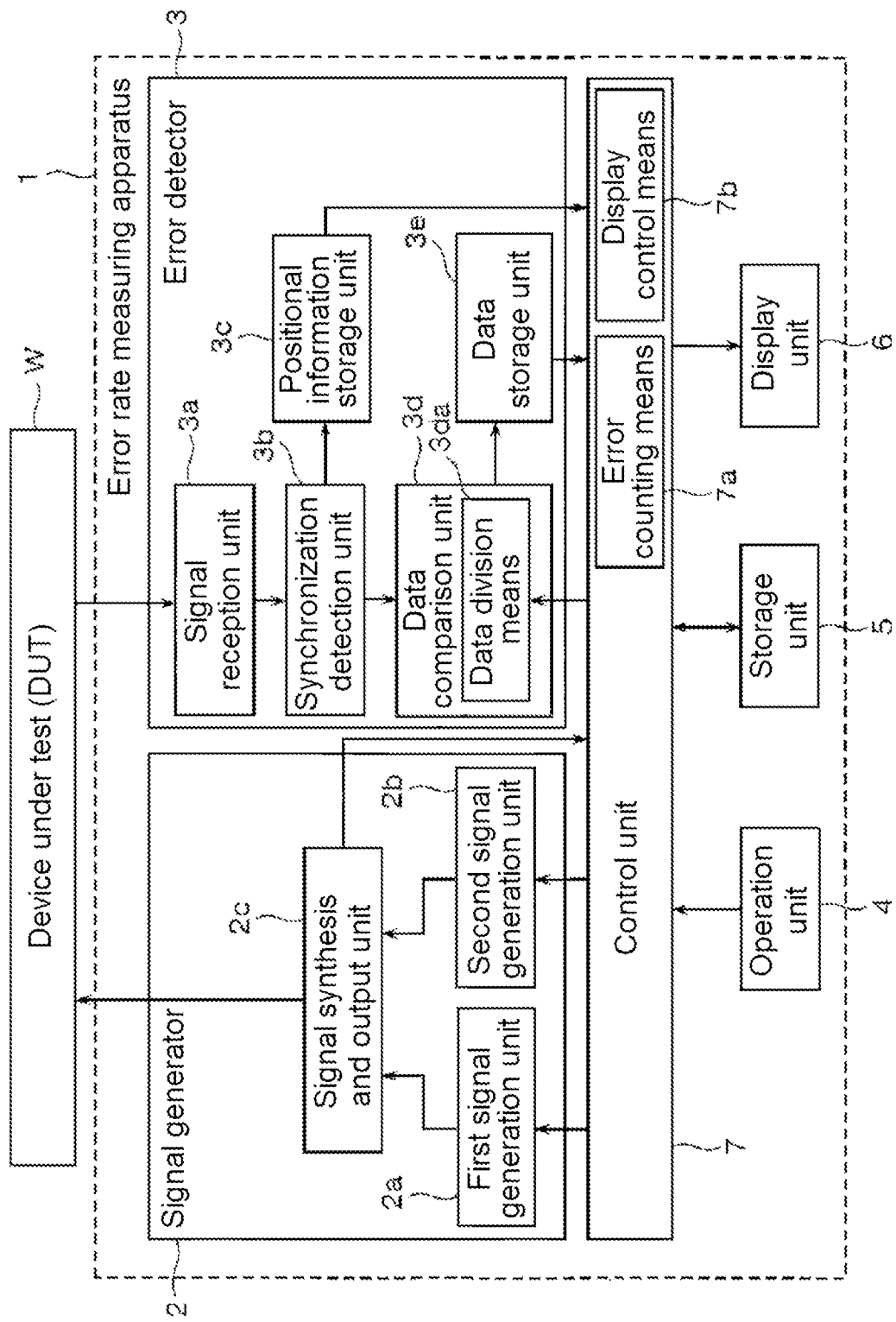
FIG. 1 is a block diagram showing the schematic configuration of an error rate measuring apparatus according to the invention.

As shown in FIG. 1, an error rate measuring apparatus 1 of an embodiment has a function of measuring whether or not a forward error correction (FEC) operation of a device under test W is possible based on a comparison result of a received signal from the device under test W when an NRZ signal of a known pattern with an inserted error or a PAM4 signal having four symbol values is input as a test signal to the device under test W, and the test signal, and schematically includes a signal generator 2, an error detector 3, an operation unit 4, a storage unit 5, a display unit 6, and a control unit 7.

In the embodiment, the configuration and processing content for realizing the function of measuring whether or not the FEC operation of the device under test W is possible is primarily described.

The signal generator 2 generates, as reference data based on a multi-value signal, an NRZ signal in a system in which there is no return to zero between bits or a PAM4 signal formed of desired symbol string data (data of a string of symbols having symbol values of 0, 1, 2, 3).

In a case of generating the PAM4 signal, as shown in FIG. 1, the signal generator 2 schematically includes a first signal generation unit 2a, a second signal generation unit 2b, and a signal synthesis and output unit 2c.

Figure 2:
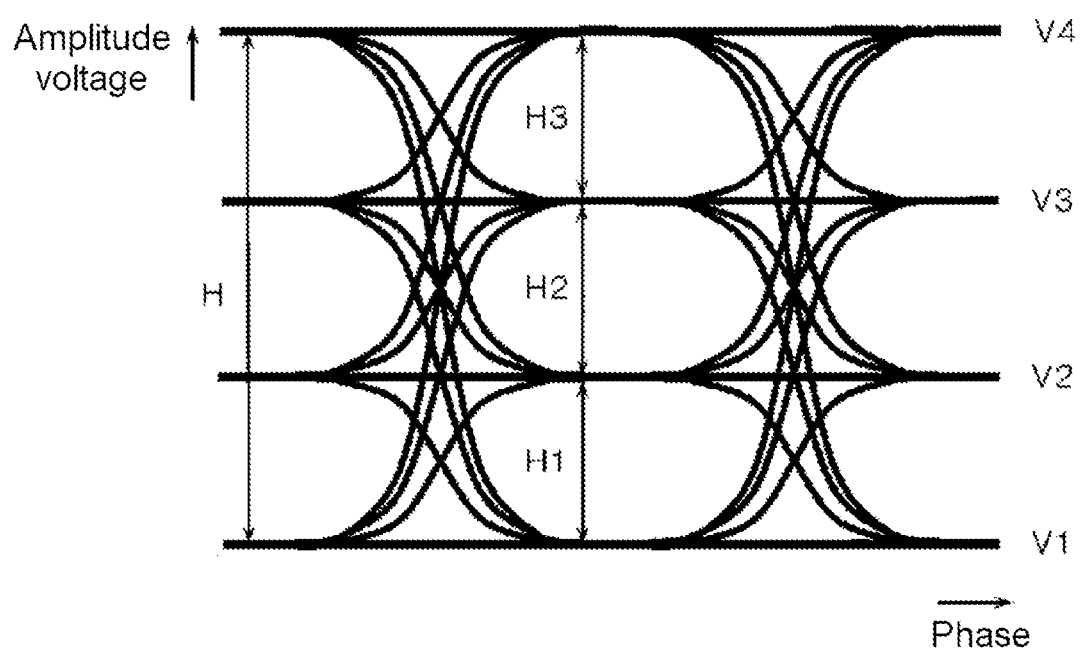
FIG. 2 is an explanatory view of a PAM4 signal.

The PAM4 signal has amplitude that is divided into four kinds for each symbol, as shown in FIG. 2 and has four different voltage levels V1, V2, V3, and V4 of amplitude. An entire amplitude voltage range H is divided into a low voltage range H1, a medium voltage range H2, and a high voltage range H3 in an ascending order of the voltage levels, and is formed of consecutive ranges based on three eye pattern openings.

Upon generating a desired PAM4 symbol string in a known pattern including fixed data, the first signal generation unit 2a generates a most significant bit (MSB) string signal that is added to a least significant bit (LSB) string signal to be generated by the second signal generation unit 2b to generate the PAM4 signal.

The second signal generation unit 2b generates the least significant bit string signal that is added to the most significant bit string signal generated by the first signal generation unit 2a to generate the PAM4 signal.

Examples of specific bit string signals that are generated by the first signal generation unit 2a and the second signal generation unit 2b include periodic patterns, such as various pseudo random patterns (Pseudo Random Bit Sequence (PRBS)) including PRBS7 (pattern length: $2^7-1$), PRBS9

(pattern length: $2^9-1$), PRBS10 (pattern length: $2^{10}-1$), PRBS11 (pattern length: $2^{11}-1$), PRBS15 (pattern length: $2^{15}-1$), and PRBS20 (pattern length: $2^{20}-1$), and evaluation patterns for evaluating PAM including PRBS13Q, PRBS31Q, and SSPRQ.

The signal synthesis and output unit 2c adds the most significant bit string signal generated by the first signal generation unit 2a and the least significant bit string signal generated by the second signal generation unit 2b to output the PAM4 signal. The PAM4 signal is input as a test signal of a known pattern to the device under test W in measuring an error rate or the like of the device under test W.

An error that is inserted into the test signal is optional. For example, any FEC Symbol Error is inserted in a case of checking FEC error tolerance of the device under test W. Furthermore, in a case of confirming tolerance of the device under test W, an error is inserted, and in a case where the device under test W confirms an error with any other test signals, an error is not inserted and confirmation is performed with a capture function.

The error detector 3 receives a signal to be output from the device under test W in compliance with the input of the NRZ signal or the PAM4 signal and measures the error rate or the like when the NRZ signal or the PAM4 signal to be reference data is input as the test signal of the known pattern from the signal generator 2 to the device under test W, and as shown in FIG. 1, includes a signal reception unit 3a, a synchronization detection unit 3b, a positional information storage unit 3c, a data comparison unit 3d, and a data storage unit 3e.

In a case where the test signal input to the device under test W is the NRZ signal, the signal reception unit 3a samples the NRZ signal received from the device under test W in a predetermined sampling period to convert the signal into bit string data (data of a bit string having 0 and 1). The bit string data converted by the signal reception unit 3a is input to the synchronization detection unit 3b.

In a case where the test signal input to the device under test W is the PAM4 signal, the signal reception unit 3a samples the PAM4 signal received from the device under test W in a predetermined sampling period to convert the signal into symbol string data (data of a string of symbols having symbol values of 0, 1, 2, and 3). The symbol string data converted by the signal reception unit 3a is input to the synchronization detection unit 3b.

In a case where the test signal input to the device under test W is the NRZ signal, the synchronization detection unit 3b synchronously fetches the reference data that is data of the bit string of the NRZ signal to be a reference read from the storage unit 5 and the bit string data of the NRZ signal received from the device under test W and output from the signal reception unit 3a at a setting timing set in advance by the operation unit 4, and outputs the fetched bit string data to be input data to the data comparison unit 3d.

In a case where the test signal input to the device under test W is the PAM4 signal, the synchronization detection unit 3b synchronously fetches reference data that is data of the symbol string of the PAM4 signal to be a reference read from the storage unit 5 and the symbol string data of the PAM4 signal received from the device under test W and output from the signal reception unit 3a at a setting timing set in advance by the operation unit 4, and outputs the fetched symbol string data to be input data to the data comparison unit 3d.

The setting timing is set in advance by the operation unit 4, for example, on the setting screen (not shown) of the display unit 6, and is a timing at which a trigger signal is generated according to a user's instruction, a timing at which a designated number of FEC Symbol Errors occur in one Codeword length (for example, in a case where one Codeword is 544 FEC Symbols, and the user desires to capture at a timing at which 16 FEC Symbol Errors occur, synchronization is achieved at a timing at which 16/544 FEC Symbol Errors occur), or a timing at which a designated number of FEC Symbol Errors continuously occur (synchronization is achieved at a timing at which a designated number of continuous FEC Symbol Errors occur regardless of a Codeword).

When synchronization is achieved, the synchronization detection unit 3b notifies the data comparison unit 3d that synchronization is achieved, and stores a synchronous position representing a position of a bit or a symbol in the reference data when synchronization is achieved, in the positional information storage unit 3c.

When synchronization of the reference data and the bit string data of the NRZ signal or the symbol string data of the PAM4 signal from the signal reception unit 3a is achieved by the synchronization detection unit 3b, the positional information storage unit 3c stores the synchronous position of the bit or the symbol in the reference data when synchronization is achieved.

In a case where the test signal input to the device under test W is the NRZ signal, the data comparison unit 3d captures a head of one FEC Symbol (10 bits or 20 bits) of the bit string data fetched synchronously with the reference data (test signal) at the setting timing by the synchronization detection unit 3b and compares each bit with error data ("1") to detect errors of each one Codeword length. That is, in a case where the bit of the bit string data is "1", this is detected as an error. The head of one FEC Symbol of the bit string data is detected by making a counter of the data comparison unit 3d run free to assume the head.

In a case where the test signal input to the device under test W is the NRZ signal, the data comparison unit 3d divides the bit string data synchronously with the reference data (test signal) at the setting timing by the synchronization detection unit 3b by one FEC Symbol length (10 bits or 20 bits) and detects a FEC Symbol Error at one FEC Symbol interval. For example, in a case where one FEC Symbol length is 10 bits, the bit string data is divided by 10 bits, and in a case where an error occurs even in one bit within 10 bits, this is detected as one FEC Symbol Error.

In a case where the test signal input to the device under test W is the PAM4 signal, the data comparison unit 3d captures the head of one FEC Symbol (10 bits or 20 bits) of the symbol string data fetched synchronously with the reference data (test signal) at the setting timing by the synchronization detection unit 3b to divide the symbol string data into most significant bit string data (hereinafter, referred to as MSB data) and least significant bit string data (hereinafter, referred to as LSB data) by data division means 3da, and compares each of the MSB data and the LSB data with the error data ("1") to detect each of a most significant bit error (hereinafter, referred to as an MSB error) and a least significant bit error (hereinafter, referred to as an LSB error) of each one Codeword length. That is, in a case where the divided MSB data is "1", this is detected and counted as an MSB error, and in a case where the divided LSB data is "1", this is detected as an LSB error. The head of one FEC Symbol of the symbol string data is detected by making the counter of the data comparison unit 3d run free to assume the head.

In a case where the test signal input to the device under test W is the PAM4 signal, the data comparison unit 3d divides the MSB data and the LSB data by one FEC Symbol length (10 bits or 20 bits), and detects FEC Symbol Errors in each of the MSB data and the LSB data at one FEC Symbol interval. For example, in a case where one FEC Symbol length is 10 bits, the MSB data and the LSB data are divided by 10 bits, and in a case where an error occurs even in one bit within 10 bits, this is detected as one FEC Symbol Error.

In FIG. 1, for convenience of description, although a configuration in which the data comparison unit 3d includes the data division means 3da has been described, the data division means 3da can be configured of a known PAM decoder, for example.

The data storage unit 3e stores comparison result data of the data comparison unit 3d, or the like along with the bit string data or the symbol string data synchronized with the reference data.

The operation unit 4 also functions as setting means, and is configured of, for example, a user interface, such as an operation knob, various keys, switches, or buttons of the error rate measuring apparatus 1 of FIG. 1, or softkeys on a display screen of the display unit 6. The operation unit 4 executes various kinds of setting regarding an error rate measurement, such as setting of the setting timing, designation of a block of the bit string data or the symbol string data displayed on the display screen (the capture screen 6a of FIGS. 3A and 3B) of the display unit 6, setting of baud rate or generation conditions of a bit string or a symbol string, and an instruction to start or end the error rate measurement.

Figure 3A:
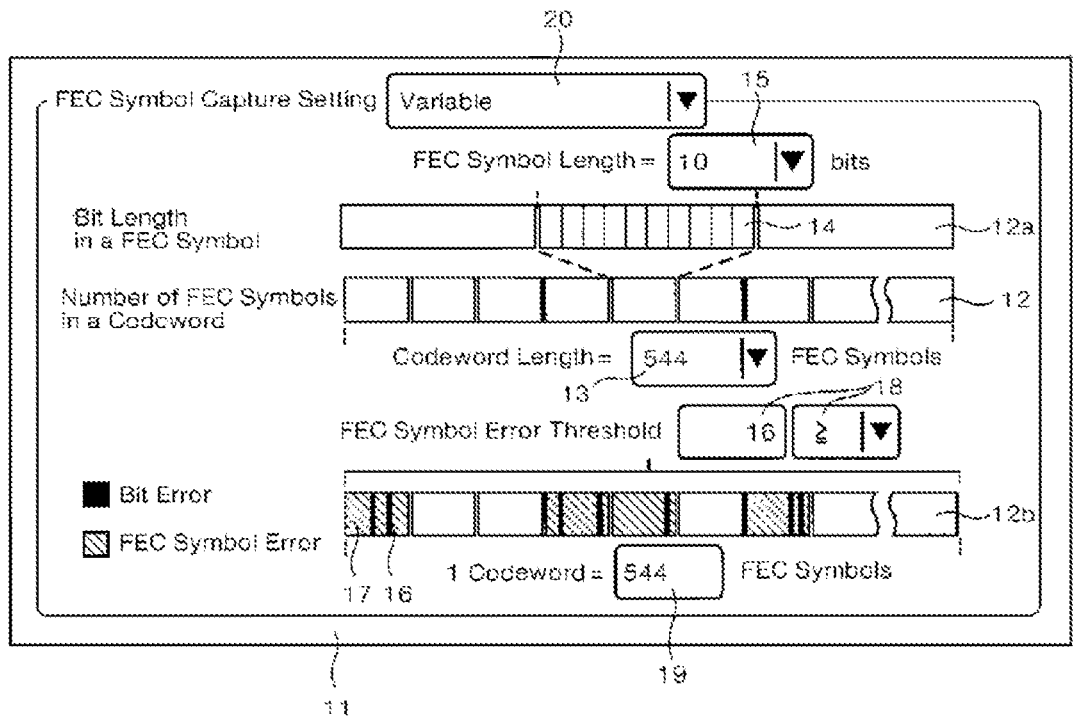
FIGS. 3A and 3B are diagrams showing an example of a setting screen of the error rate measuring apparatus according to the invention.

FIG. 3A shows an example of a setting screen 11 on which setting parameters (one Codeword length, one FEC Symbol length, and a FEC Symbol Error Threshold (a threshold value of FEC Symbol Errors for starting capture) of the FEC) to a signal received from the device under test W are set.

On the setting screen 11 of FIG. 3A, as "Number of FEC Symbols in a Codeword" indicating the length of one Codeword of the FEC, one Codeword is displayed by a violet bar-shaped graphic 12 of which the length is partially omitted and which is sectioned by FEC Symbols.

At a position directly below the graphic 12 of "Number of FEC Symbols in a Codeword", an input box 13 for selecting and setting the number of FEC Symbols forming "Codeword Length" from a pull-down menu is displayed. The setting screen 11 of FIG. 3A shows a state in which "544" is selected and set in the input box 13.

At a position directly above the graphic 12 of "Number of FEC Symbols in a Codeword", "Bit Length in a FEC Symbol" that is indicated as forming a part of a Codeword by a dotted line and is color-coded is displayed by a bar-shaped graphic 14. For example, color-coding display is performed in such a manner that the graphic 14 of the FEC Symbol is blue and portions corresponding to a graphic 12a of the Codeword except for the graphic 14 of the FEC Symbol are violet.

At a position directly above the graphic 14 of "Bit Length in a FEC Symbol", an input box 15 for selecting and setting the number of bits (10 bits or 20 bits) of "FEC Symbol Length" from a pull-down menu is displayed. The setting screen of FIG. 3A shows a state in which "10" is selected and set in the input box 15.

In addition, below the graphic 12 of "Number of FEC Symbols in a Codeword", as an error included on one Codeword, a graphic 16 of "Bit Error" and a graphic 17 of "FEC Symbol Error" are color-coded and displayed in a graphic 12b of one Codeword. For example, color-coding display is performed in such a manner that the graphic 12b of one Codeword is violet, the graphic 16 of "Bit Error" is yellow, and the graphic 17 of "FEC Symbol Error" is red.

At a position directly above the graphic 12b of one Codeword where the graphic 16 of "Bit Error" and the graphic 17 of "FEC Symbol Error" are displayed, an input box 18 for setting a threshold value of "FEC Symbol Error Threshold" using an equality sign (=), an inequality sign with an equality sign (≥) and a numeral is displayed.

At a position directly below of the graphic 12b of one Codeword where the graphic 16 of "Bit Error" and the graphic 17 of "FEC Symbol Error" are displayed, an input box 19 for inputting the number of FEC Symbols forming one Codeword is displayed.

Figure 3B:
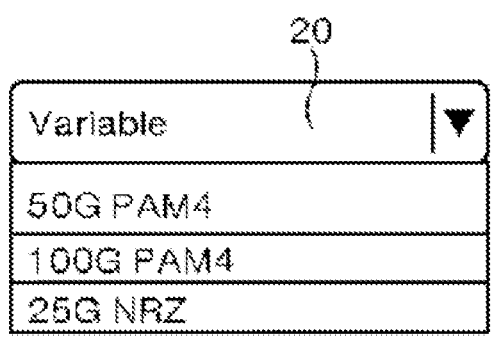

Then, in an upper portion of the setting screen 11 of FIG. 3A, a selection item 20 of "FEC Symbol Capture Setting" is displayed. As shown in FIG. 3B, in regard to the selection item 20 of "FEC Symbol Capture Setting", selection items of settings according to a communication standard are displayed in a pull-down menu. In an example of FIG. 3B, "Variable", "50G PAM4", "100G PAM4", and "25G NRZ" are displayed as selection items in a pull-down menu.

FIG. 3A shows a state in which "Variable" is selected as the selection item 20 of "FEC Symbol Capture Setting". In the state in which "Variable" is selected, it is possible to allow free selection and input to each input box from the pull-down menu.

In the example of FIG. 3A, "50G PAM4", "100G PAM4", and "25G NRZ" can be selected as the selection item 20 of a preset setting, and in a case where any preset setting is selected, respective parameters based on a communication standard of the selected preset setting is automatically set.

For example, in a case where "50G PAM4" is selected as the preset setting, the respective parameters are automatically set in such a manner that the Codeword length is "544", the FEC Symbol length is "10", and the FEC Symbol Error Threshold is "16".

Furthermore, in a case where "100G PAM4" is selected as the preset setting, the respective parameters are automatically set in such a manner that the Codeword length is "272", the FEC Symbol length is "20", and the FEC Symbol Error Threshold is "16".

In addition, in a case where "50G NRZ" is set as the preset setting, the respective parameters are automatically selected in such a manner that the Codeword length is "528", the FEC Symbol length is "10", and the FEC Symbol Error Threshold is "8".

In this way, on the setting screen 11 of FIG. 3A, a configuration relationship of the FEC Symbol to one Codeword and a correspondence relationship of the FEC Symbol Error to one Codeword are graphically displayed in an identifiable manner. With this, it is possible to allow the user to set the respective parameters of the FEC to the signal received from the device under test W after visually recognizing the configuration relationship or the correspondence relationship of "Number of FEC Symbols in a Codeword", "Bit Length in a FEC Symbol", "Bit Error", and "FEC Symbol Error" even though the user is not an expert who knows the communication standard.

On the setting screen 11 of FIG. 3A, although a case where "Bit Length in a FEC Symbol", and "Bit Error" and "FEC Symbol Error" are vertically arranged centering on "Number of FEC Symbols in a Codeword" and are graphically displayed has been shown such that the configuration relationship of "Number of FEC Symbols in a Codeword", "Bit Length in a FEC Symbol", "Bit Error", and "FEC Symbol Error" is easily visually recognized, the invention is not limited to this arrangement. For example, "Bit Length in a FEC Symbol", and "Bit Error" and "FEC Symbol Error" may be reversely arranged or "Bit Length in a FEC Symbol", and "Bit Error" and "FEC Symbol Error" may be arranged above or below "Number of FEC Symbols in a Codeword" and may be graphically displayed.

The storage unit 5 stores a bit string of the NRZ signal or a symbol string of the PAM4 signal (a string of symbols having symbol values of 0, 1, 2, and 3) input to the device under test W as a test signal of a known pattern from the signal synthesis and output unit 2c. The bit string of the NRZ signal or the symbol string of the PAM4 signal input to the device under test W as the test signal of the known pattern is reference data to be a reference for comparison with input data that is generated from the signal received from the device under test W.

The storage unit 5 stores a counting result of error counting means 7a described below of the control unit 7. In addition, the storage unit 5 stores information regarding the setting timing, the baud rate, the generation conditions of the bit string or the symbol string, and the like. Such information can be appropriately selected and set by the operation unit 4 through the user interface.

A configuration may be made in which, in a case where the control unit 7 or the signal generator 2 can recognize the bit string of the NRZ signal or the symbol string of the PAM4 signal to be the test signal, the bit string of the NRZ signal or the symbol string of the PAM4 signal that is the test signal of the known pattern, that is, the reference data is stored from the control unit 7 or the signal generator 2 to the storage unit 5.

The display unit 6 is configured of, for example, a liquid crystal display or the like in the error rate measuring apparatus 1 of FIG. 1, and displays the setting screen regarding an error rate measurement, each compliance test (a test about whether or not the device under test W conforms to the communication standard) including the error rate measurement, the capture screen, and the like under the control of display control means 7b described below. The display unit 6 also has an operation function of the operation unit 4, such as softkeys on the display screen.

The display unit 6 displays a measurement screen 21 in a display form shown in FIG. 4 or a measurement screen in a display form shown in FIG. 5, for example, in addition to the setting screen 11 of FIG. 3A under the control of display control means 7b described below. The measurement screen 21 of FIG. 4 or the measurement screen 22 of FIG. 5 includes a simple setting display region 23 and a measurement result display region 24.

The simple setting display region 23 is a region where the setting parameters (one Codeword length, one FEC Symbol length, and a FEC Symbol Error Threshold (a threshold value of FEC Symbol Errors for starting capture) of the FEC) to the signal received from the device under test W are simply set.

Moreover, in the simple setting display region 23, as "Number of FEC Symbols in a Codeword" indicating the length of one Codeword of the FEC, an input box 25 for selecting and setting the number of FEC Symbols forming "Codeword Length" from a pull-down menu is displayed. The simple setting display region 23 of FIG. 4 or 5 shows a state in which "544" is selected and set in the input box 25.

On a right side of "Number of FEC Symbols in a Codeword", an input box 26 for selecting and setting the number of bits of "Bit Length in a FEC Symbol" forming a part of a Codeword from a pull-down menu is displayed. The simple setting display region 23 of FIG. 4 or 5 shows a state in which "10" is selected and set in the input box 26.

Below "Number of FEC Symbols in a Codeword", an input box 27 for setting the threshold value of "FEC Symbol Error Threshold" using an equality sign (=), an inequality sign with an equality sign (≥) and a numeral is displayed. The simple setting display region 23 of FIG. 4 or 5 shows a state in which the threshold value of "FEC Symbol Error Threshold" is set to "15 or more".

In the simple setting display region 23, as "Preset", selection items 28 of settings according to the communication standard are displayed in a pull-down menu. For example, "Variable", "50G PAM4", "100G PAM4", and "25G NRZ" are displayed as the selection items 28 of "Preset" in a pull-down menu. The simple setting display region 23 of FIG. 4 shows a state in which "50G NRZ" is selected and set as the preset setting. Furthermore, the simple setting display region 23 of FIG. 5 shows a state in which "50G PAM4" is selected and set as the preset setting. In a case where "Variable" is selected and set as "Preset", it is possible to allow the user to optically set the values of "Number of FEC Symbols in a Codeword", "Bit Length in a FEC Symbol", and "FEC Symbol Error Threshold" according to the communication standard of the device under test W.

The measurement result display region 24 is a region where a measurement result regarding errors based on counting of the error counting means 7a described below. For example, in the measurement result display region 24 of FIG. 4, an error rate and an error count value of each of Codeword, Total, INS, and OMI are displayed. Furthermore, in the measurement result display region 24 of FIG. 5, an error rate and an error count value of each of Codeword, Symbol, and Bit are displayed.

The control unit 7 is configured of a central processing unit (CPU) and a storage element, such as a ROM or a RAM, to measure an error rate of the PAM4 signal, integrally controls the signal generator 2, the error detector 3, the operation unit 4, the storage unit 5, and the display unit 6, and includes the error counting means 7a and the display control means 7b.

In a case where the test signal input to the device under test W is the NRZ signal, the error counting means 7a counts errors detected by the data comparison unit 3d (including counting Codewords) and counts the FEC Symbol Errors detected at one FEC Symbol interval.

In a case where the test signal input to the device under test W is the PAM4 signal, the error counting means 7a counts MSB errors and LSB errors detected by the data comparison unit 3d (including counting Codewords) and counts FEC Symbol Errors detected at one FEC Symbol interval.

Figure 4:
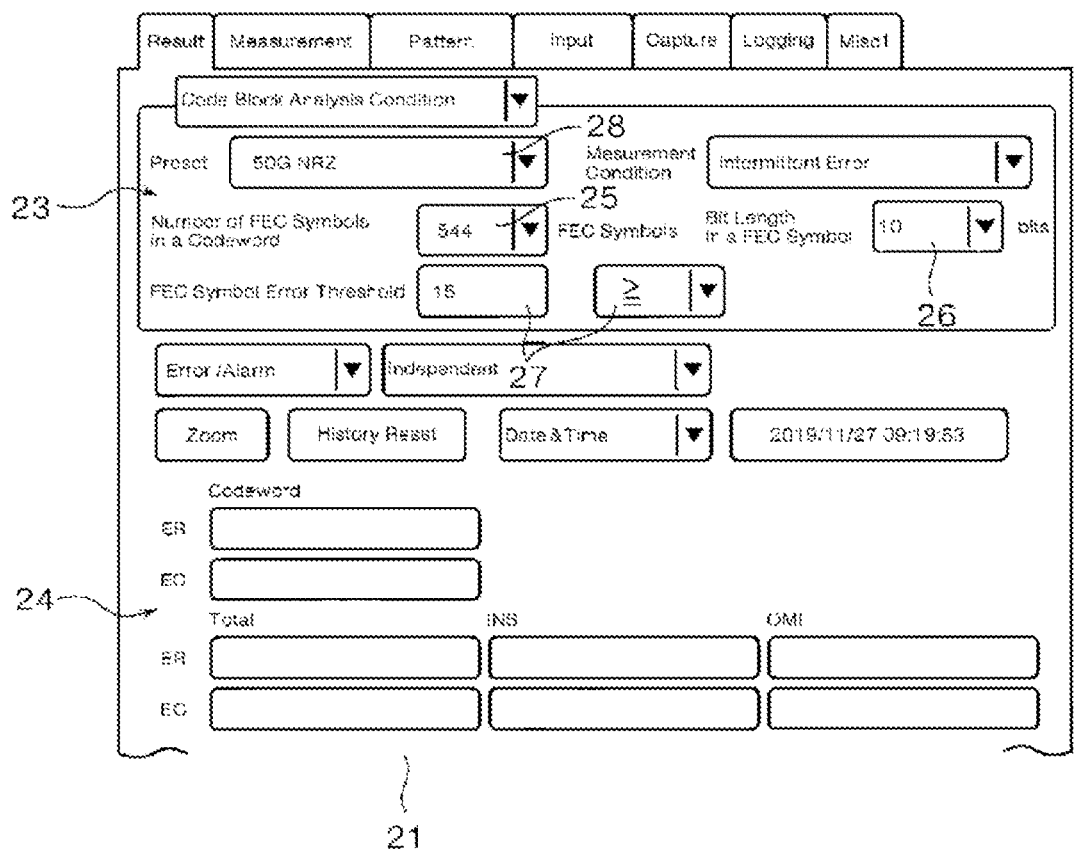
FIG. 4 is a diagram showing an example of a measurement screen in a case where an NRZ signal is input to a device under test in the error rate measuring apparatus according to the invention.
Figure 5:
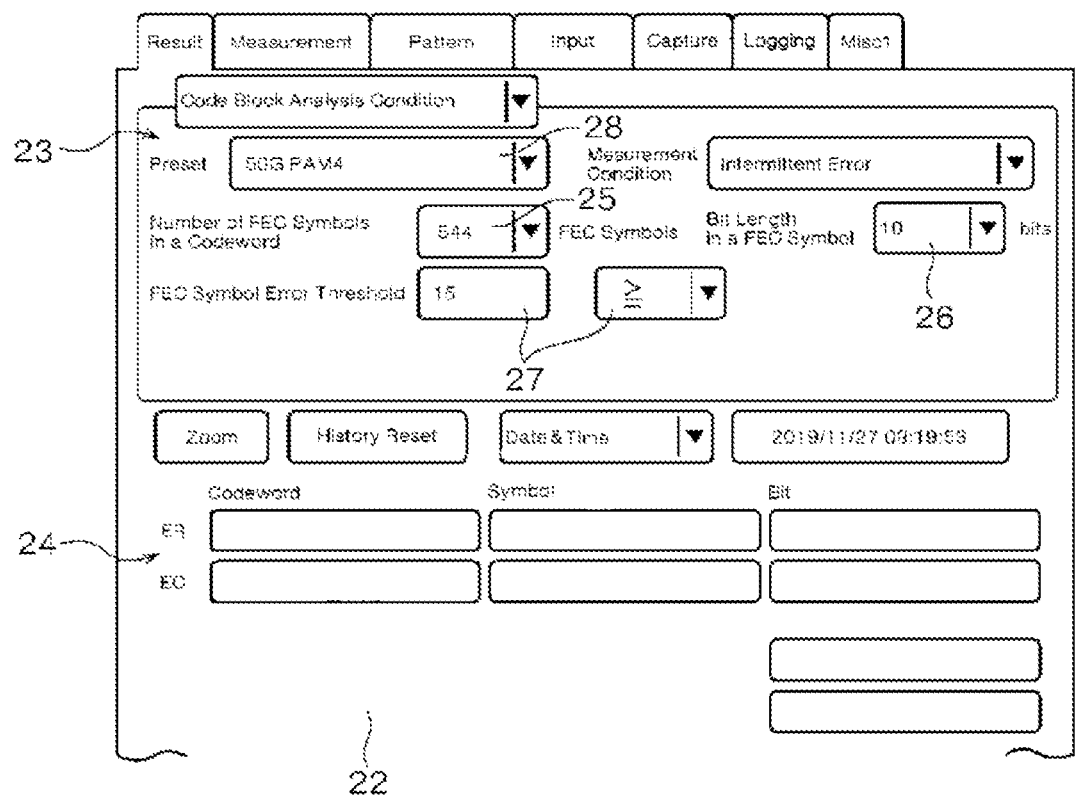
FIG. 5 is a diagram showing an example of a measurement screen in a case where a PAM4 signal is input to the device under test in the error rate measuring apparatus according to the invention.

The display control means 7b controls display on the display screen of the display unit 6, for example, the setting screen 11 of FIG. 3A, the measurement screen 21 of FIG. 4, or the measurement screen 22 of FIG. 5.

Next, as a processing operation of error counting of the error rate measuring apparatus 1 configured as above, cases classified based on whether the test signal input to the device under test W is the NRZ signal or the PAM4 signal will be described referring to FIGS. 6 and 7.

Case of NRZ Signal

Figure 6:
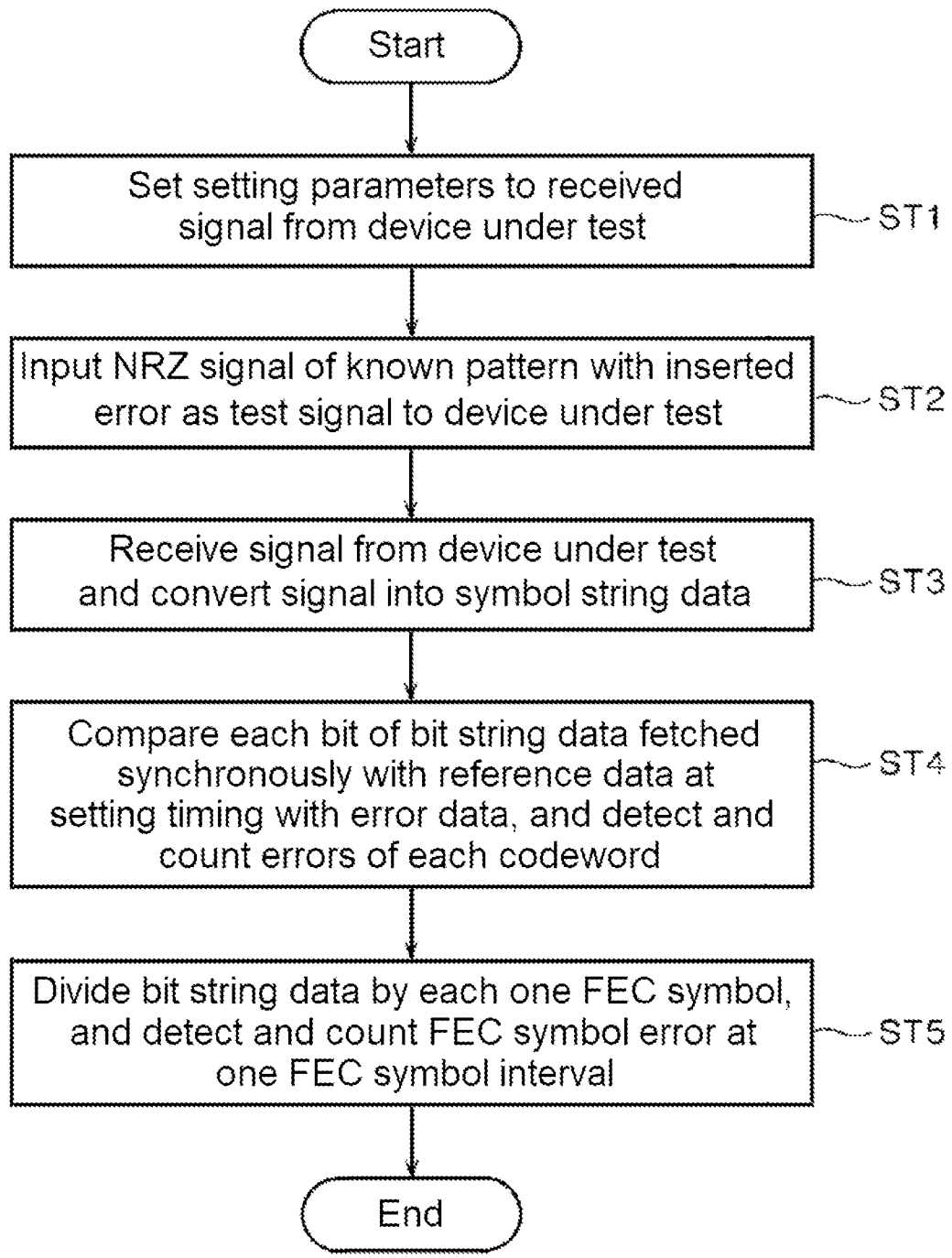
FIG. 6 is a flowchart of a processing operation of error counting in a case where the NRZ signal is input to the device under test in the error rate measuring apparatus according to the invention.

As shown in FIG. 6, first, the setting parameters to the received signal from the device under test W are set by the operation unit 4 (ST1). Specifically, on the setting screen 11 of FIG. 3A or in the simple setting display region 23 of the measurement screen 21 of FIG. 4, one Codeword length, one FEC Symbol length, and the FEC Symbol Error Threshold are set based on the communication standard of the device under test W to be measured or the preset setting (for example, 25G NRZ) according to the communication standard is selected and set.

After the above-described setting ends, the NRZ signal (25G NRZ or the like conforming to the setting parameters) of the known pattern with an inserted error is input as the test signal to the device under test W by the signal generator 2 (ST2).

Then, a signal returned from the device under test W in compliance with the input of the test signal to the device under test W is received and converted into bit string data by the signal reception unit 3a (ST3).

Next, the head of one FEC Symbol (10 bits or 20 bits) of the bit string data fetched synchronously with the reference data (test signal) at the setting timing by the synchronization detection unit 3b is captured, each bit is compared with error data ("1") by the data comparison unit 3d to detect errors of each one Codeword length, and the detected errors of each one Codeword length are counted by the error counting means 7a (ST4). In this case, the number of Codewords is counted. The head of one FEC Symbol of the bit string data is detected by making a counter of the data comparison unit 3d run free to assume the head.

Subsequently, the bit string data is divided by each one FEC Symbol length, FEC Symbol Errors are detected at one FEC Symbol interval, and the detected FEC Symbol Errors are counted by the error counting means 7a (ST5). For example, in a case where one FEC Symbol length is 10 bits, the bit string data is divided by 10 bits, and in a case where an error occurs even in one bit within 10 bits, this is detected and counted as one FEC Symbol Error. Then, a result of counting by the error counting means 7a is displayed on, for example, the measurement screen 21 of FIG. 4 under the control of the display control means 7b.

Case of PAM4 Signal

Figure 7:
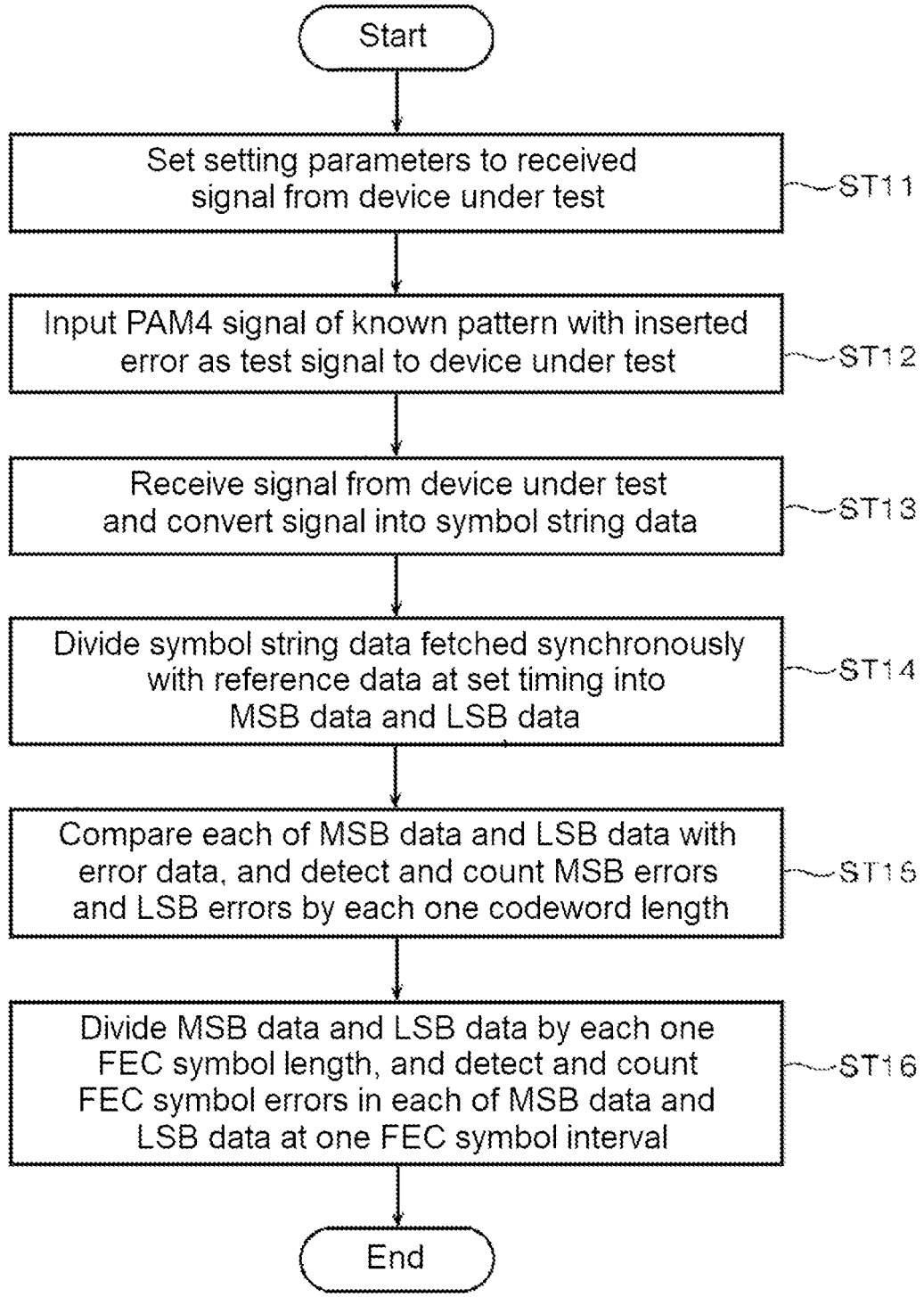
FIG. 7 is a flowchart of a processing operation of error counting in a case where the PAM4 signal is input to the device under test in the error rate measuring apparatus according to the invention.

As shown in FIG. 7, first, the setting parameters to the received signal from the device under test W are set by the operation unit 4 (ST11). Specifically, on the setting screen 11 of FIG. 3A or in the simple setting display region 23 of the measurement screen 22 of FIG. 5, one Codeword length, one FEC Symbol length, and the FEC Symbol Error Threshold are set based on the communication standard of the device under test W to be measured or the preset setting (for example, 50G PAM4) according to the communication standard is selected and set.

After the above-described setting ends, the PAM4 signal (for example, 50G PAM4 conforming to the setting parameters) of the known pattern with an inserted error is input as the test signal to the device under test W by the signal generator 2 (ST12).

Then, a signal returned from the device under test W in compliance with the input of the test signal to the device under test W is received and converted into symbol string data by the signal reception unit 3a (ST13).

Next, the head of one FEC Symbol (10 bits or 20 bits) of the symbol string data fetched synchronously with the reference data (test signal) at the setting timing by the synchronization detection unit 3b is captured, and one FEC Symbol is divided into MSB data and LSB data by the data division means 3da (ST14). Subsequently, the MSB data and the LSB data are compared with error data ("1") by the data comparison unit 3d to detect MSB errors and LSB errors by one Codeword length, and the MSB errors and the LSB errors of each one Codeword length are counted by the error counting means 7a (ST15). In this case, the number of Codewords is counted. The head of one FEC Symbol of the symbol string data is detected by making the counter of the data comparison unit 3d run free to assume the head.

The error data ("1") is divided into error data for comparing with the MSB data and error data for comparing with the LSB data, in a case where the MSB data is "1", this is detected and counted as an MSB error, and in a case where the LSB data is "1", this is detected and counted as an LSB error.

Then, the MSB data and the LSB data are divided by each one FEC Symbol length, FEC Symbol Errors are detected in each of the MSB data and the LSB data at one FEC Symbol interval, and the detected FEC Symbol Errors are counted by the error counting means 7a (ST16). For example, in a case where one FEC Symbol length is 10 bits, the MSB data and the LSB data are divided by 10 bits, and in a case where an error occurs even in one bit within 10 bits, this is detected and counted as one FEC Symbol Error. Then, a result of counting by the error counting means 7a is displayed on, for example, the measurement screen 22 of FIG. 5 under the control of the display control means 7b.

Incidentally, in the above-described embodiment, as shown in FIG. 1, although a configuration is made in which the signal generator 2, the error detector 3, the operation unit 4, the storage unit 5, the display unit 6, and the control unit 7 are included in the error rate measuring apparatus 1, the invention is not limited to this configuration. For example, the signal generator 2 and the error detector 3 can also be separately modularized or may be housed in individual housings, and can also be configured of an external apparatus, such as a personal computer to which the operation unit 4 and the display unit 6 are externally connected.

In this way, according to the embodiment, it is possible to count FEC Symbol Errors in a region set by a user based on a communication standard of a device under test. In addition, the number of counted FEC Symbol Errors can be confirmed with a numerical value on a display screen, and thus, it is possible to efficiently perform debugging.

Although the best mode of the error rate measuring apparatus and the error counting method according to the invention has been described above, the invention is not limited by the description and the drawings according to this mode. That is, it is a matter of course that other modes, examples, operation techniques and the like made by those skilled in the art based on this mode are all included in the scope of the present invention.

DESCRIPTION OF REFERENCE NUMERALS AND SIGNS 1 error rate measuring apparatus
2 signal generator
2a first signal generation unit
2b second signal generation unit
2c signal synthesis and output unit
3 error detector
3a signal reception unit
3b synchronization detection unit
3c positional information storage unit
3d data comparison unit
3da data division means
3e data storage unit
4 operation unit
5 storage unit
6 display unit
7 control unit
7a error counting means
7b display control means 11 setting screen
12, 12a, 12b graphic of Codeword
13, 15, 18, 19, 25, 27 input box
14 graphic of FEC Symbol
16 graphic of bit Error
17 graphic of FEC Symbol Error
20, 28 selection item
21, 22 measurement screen
23 simple setting display region
24 measurement result display region
W device under test

What is claimed is:

1. An error rate measuring apparatus comprising:
a transceiver configured to:
   transmit a non return to zero (NRZ) signal of a known pattern as a test signal to a device under test; and
   receive, from the device under test, a signal outputted from the device under test compliant with an input of the test signal; and
a processor configured to:
   set one Codeword length and one FEC Symbol length of the FEC according to a communication standard of a device under test;
   compare bit string data obtained by converting the signal received from the device under test with predetermined error data to detect errors of each one Codeword length, and detect FEC Symbol Errors of the bit string data at one FEC Symbol interval;
   count the number of errors and the number of FEC Symbol Errors of each one Codeword length as the comparison result;
   determine whether a forward error correction (FEC) operation of the device under test is possible or not based on a comparison result of the signal received from the device under test and the test signal; and
   output a determination result of whether or not the FEC operation of the device under test is possible on a display screen with the number of counted FEC Symbol Errors for performing debugging.

2. The error rate measuring apparatus according to claim 1, wherein
the display screen is configured to display an error rate and an error count value based on a result of the counting.

3. An error rate measuring apparatus comprising:
a transceiver configured to:
   transmit a non return to zero (NRZ) signal of a known pattern as a test signal to a device under test; and
   receive, from the device under test, a signal outputted from the device under test compliant with an input of the test signal; and
a processor configured to:
   set one Codeword length and one FEC Symbol length of the FEC according to a communication standard of the device under test;
   divide symbol string data obtained by converting the signal received from the device under test into most significant bit (MSB) string data and least significant bit (LSB) string data;
   compare each of the most significant bit string data and the least significant bit string data with predetermined error data to detect most significant bit errors and least significant bit errors of each one Codeword length and detect FEC Symbol Errors of each of the most significant bit string data and the least significant bit string data at one FEC Symbol interval;
   count the number of most significant bit errors and the number of least significant bit errors, and the number of FEC Symbol Errors as a comparison result;
   determine whether a forward error correction (FEC) operation of the device under test is possible or not based on the comparison result; and
   output a determination result of whether or not the FEC operation of the device under test is possible on a display screen with the number of counted FEC Symbol Errors for performing debugging.

4. The error rate measuring apparatus according to claim 3, wherein
the display screen is configured to display an error rate and an error count value based on a result of the counting.

5. An error counting method for operating an error rate measuring apparatus, the error counting method comprising:
   a step of transmitting a non return to zero (NRZ) signal of a known pattern as a test signal to a device under test;
   a step of receiving, from the device under test, a signal outputted from the device under test compliant with an input of the test signal;
   a step of setting one Codeword length and one FEC Symbol length of the FEC according to a communication standard of the device under test;
   a step of comparing bit string data obtained by converting the signal received from the device under test with predetermined error data to detect errors of each one Codeword length, and detecting FEC Symbol Errors of the bit string data at one FEC Symbol interval; and
   a step of counting the number of detected errors and the number of detected FEC Symbol Errors of each one Codeword length as the comparison result;
   a step of determining whether a forward error correction (FEC) operation of the device under test is possible or not based on a comparison result of the signal received from the device under test and the test signal; and
   a step of outputting a determination result of whether or not the FEC operation of the device under test is possible on a display screen with the number of counted FEC Symbol Errors for performing debugging.

6. The error counting method for operating the error rate measuring apparatus according to claim 5, further comprising:
   a step of displaying an error rate and an error count value based on a result of the counting.

7. An error counting method for operating an error rate measuring apparatus, the error counting method comprising:
   a step of transmitting a non return to zero (NRZ) signal of a known pattern as a test signal to a device under test and
   a step of receiving, from the device under test, a signal outputted from the device under test compliant with an input of the test signal;
   a step of setting one Codeword length and one FEC Symbol length of the FEC according to a communication standard of the device under test;
   a step of dividing symbol string data obtained by converting the signal received from the device under test into most significant bit (MSB) string data and least significant bit (LSB) string data;
   a step of comparing each of the divided most significant bit string data and least significant bit string data with predetermined error data to detect most significant bit errors and least significant bit errors of each one Codeword length, and detecting FEC Symbol Errors of each of the most significant bit string data and the least significant bit string data at one FEC Symbol interval;

a step of counting the number of detected most significant bit errors and the number of detected least significant bit errors, and the number of detected FEC Symbol Errors, as the comparison result; and a step of determining whether a forward error correction (FEC) operation of the device under test is possible or not based on a comparison result of the signal received from the device under test and the test signal; and a step of outputting a determination result of whether or not the FEC operation of the device under test is possible on a display screen with the number of counted FEC Symbol Errors for performing debugging.

8. The error counting method for operating the error rate measuring apparatus according to claim 7, further comprising:

a step of displaying an error rate and an error count value based on a result of the counting.

* * * * *